US012606939B2

(12) United States Patent
Bryant et al.

(10) Patent No.: US 12,606,939 B2
(45) Date of Patent: Apr. 21, 2026

(54) POLYMER FIBER WITH ADDITIVE AND METHODS AND ARTICLES RELATED THERETO

(71) Applicant: Shaw Industries Group, Inc., Dalton, GA (US)

(72) Inventors: Christopher S. Bryant, Rocky Face, GA (US); Alexander Freas, Andalusia, AL (US); Tansley Cornwell, Rome, GA (US); Luke Tixier, Dozier, AL (US); Alan Schaff, Easley, SC (US); Jonathan Hatch, Mckenzie, AL (US); Caleb Cochran, Opp, AL (US)

(73) Assignee: Shaw Industries Group, Inc., Dalton, GA (US)

( * ) Notice: Subject to any disclaimer, the term of this patent is extended or adjusted under 35 U.S.C. 154(b) by 215 days.

(21) Appl. No.: 18/065,680

(22) Filed: Dec. 14, 2022

(65) Prior Publication Data

US 2023/0203714 A1 Jun. 29, 2023

Related U.S. Application Data

(60) Provisional application No. 63/290,449, filed on Dec. 16, 2021.

(51) Int. Cl.
 *D01D 1/06* (2006.01)
 *D01F 1/04* (2006.01)
 *G05D 7/06* (2006.01)

(52) U.S. Cl.
 CPC .............. *D01D 1/065* (2013.01); *D01F 1/04* (2013.01); *G05D 7/0623* (2013.01)

(58) Field of Classification Search
 CPC .................................. D01D 1/09; D01D 1/065
 See application file for complete search history.

(56) References Cited

U.S. PATENT DOCUMENTS

| | | | | |
|---|---|---|---|---|
| 3,754,734 A | * | 8/1973 | Hoyle | B29C 48/29 366/159.1 |
| 5,826,978 A | * | 10/1998 | Zikeli | D01D 1/09 425/149 |
| 2005/0128869 A1 | * | 6/2005 | Helbing | B29C 48/29 366/160.2 |
| 2005/0258562 A1 | * | 11/2005 | Wilson | D01D 4/02 264/211.14 |
| 2013/0012695 A1 | * | 1/2013 | Turner | D01D 5/12 264/108 |
| 2018/0127893 A1 | * | 5/2018 | Clark | B29B 7/88 |
| 2019/0085483 A1 | * | 3/2019 | Clark | B29C 48/17 |

* cited by examiner

*Primary Examiner* — Andrew D Graham
(74) *Attorney, Agent, or Firm* — Ballard Spahr LLP

(57) ABSTRACT

Described is a fiber containing at least one polymer and at least one additive. The concertation of the additive is not constant throughout the fiber, but changes along the length of the fiber. Also disclosed is a method of making a fiber.

20 Claims, 9 Drawing Sheets

Sinusoidal pattern

Concentration of additive

Length of fiber 100

Triangular pattern

Concentration of additive

Length of fiber 100

Square pattern

Length of fiber 100

Sawtooth pattern

Length of fiber 100

Example of varying concentration
around concentration baseline
pattern

POLYMER FIBER WITH ADDITIVE AND METHODS AND ARTICLES RELATED THERETO

CROSS-REFERENCE TO RELATED APPLICATIONS

This Application claims the benefit of U.S. Provisional Application No. 63/290,449 filed Dec. 16, 2021, which is incorporated herein by reference in its entirety.

FIELD

This disclosure relates to a polymer fiber with at least one additive, for example a colorant, and methods for manufacturing a fiber, to vary the concentration of the at least one additive throughout the polymer fiber.

BACKGROUND

Polymer fiber containing an additive, such as a colorant, can be produced in different ways. For example, the additive and the polymer can be mixed together in a main hopper, which feeds an extruder to produce a homogeneous polymer melt containing the additive. The homogeneous polymer melt is subsequently used to produce a fiber, for example by use of a spinneret. In another example, an extruder produces a polymer melt in a transfer line and an additive is injected into the transfer line. The additive and polymer melt are mixed in the transfer line to produce a homogeneous polymer melt, which is subsequently used to produce a fiber, for example by use of a spinneret. In both cases the additive is evenly distributed throughout the length of the produced fiber.

It is desired to produce a fiber having a varied concentration of the additive throughout a length of the fiber. Such a fiber and method for producing such fiber is disclosed herein.

SUMMARY

Disclosed herein is a fiber having a length. In one aspect, the fiber comprises: at least one polymer, and at least one additive, wherein a concentration of the at least one additive in the composition changes along the length of the fiber to provide at least a first location having a first concentration of the at least one additive in the composition, a second location having a second concentration of the at least one additive in the composition, and a third location having a third concentration of the at least one additive in the composition, wherein the second location is positioned between the first location and the third location along the length of the fiber, wherein the second concentration of the at least one additive at the second location is greater than each of the first concentration of the at least one additive at the first location and the third concentration of the at least one additive at the third location.

In one aspect, the fiber having a length comprises: at least one polymer, and at least one additive, wherein a concentration of the at least one additive in the composition changes along the length of the fiber to provide at least a first location having a first concentration of the at least one additive in the composition, a second location having a second concentration of the at least one additive in the composition, and a third location having a third concentration of the at least one additive in the composition, wherein the second location is positioned between the first location and the third location along the length of the fiber, wherein the second concentration of the at least one additive at the second location is lower than each of the first concentration of the at least one additive at the first location and the third concentration of the at least one additive at the third location.

Also disclosed is a fiber having a length produced by a method comprising: injecting at least one additive into a polymer flow of a main polymer transfer line to produce a modified polymer flow; and forming, by at least one spinneret, the fiber from the modified polymer flow, wherein injecting the at least one additive into the polymer flow of the main polymer transfer line comprises changing a flow rate of the at least one additive at least twice within fifteen minutes to provide at least a first flow rate, a second flow rate that occurs after the first flow rate, and a third flow rate that occurs after the second flow rate, wherein the second flow rate is greater than each of the first flow rate and the third flow rate.

Also disclosed herein is a method comprising:

injecting at least one additive into a polymer flow of a main polymer transfer line to produce a modified polymer flow; and forming, by at least one spinneret, at least one fiber from the modified polymer flow, wherein injecting the at least one additive into the polymer flow of the main polymer transfer line comprises changing a flow rate of the at least one additive at least twice within fifteen minutes to provide at least a first flow rate, a second flow rate that occurs after the first flow rate, and a third flow rate that occurs after the second flow rate, wherein the second flow rate is greater than each of the first flow rate and the third flow rate, or wherein the second flow rate is lower than each of the first flow rate and the third flow rate. Also disclosed herein is a fiber produced by the method.

Additional advantages of the disclosed system and method will be set forth in part in the description which follows, and in part will be understood from the description, or may be learned by practice of the disclosed system and method. The advantages of the disclosed system and method will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed apparatus, system, and method and together with the description, serve to explain the principles of the disclosed apparatus, system, and method.

DETAILED DESCRIPTION

Figure 1A:
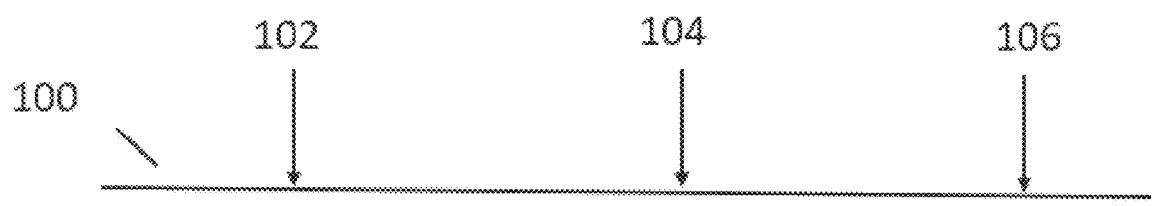
FIG. 1A shows an exemplary fiber disclosed herein with a first location, second location, and third location.

The disclosed system and method may be understood more readily by reference to the following detailed description of particular embodiments and the examples included therein and to the Figures and their previous and following description.

It is to be understood that the terminology used herein is for the purpose of describing particular embodiments only and is not intended to limit the scope of the present invention which will be limited only by the appended claims.

1. Definitions

It must be noted that as used herein and in the appended claims, the singular forms "a," "an," and "the" include plural references unless the context clearly dictates otherwise. Thus, for example, reference to "a side arm extruder assembly" includes one or more of such side arm extruder assemblies, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

A range recited as "between X to Y," includes the endpoints of X and Y.

Optionally, in some aspects, when values are approximated by use of the antecedents "about," "substantially," or "generally," it is contemplated that values within up to 15%, up to 10%, up to 5%, or up to 1% (above or below) of the particularly stated value or characteristic can be included within the scope of those aspects. Similarly, for antecedents "about," "substantially," or "generally," with reference to parallel or perpendicular, it is contemplated that angular offsets up to 10 degrees, or up to 5 degrees, or up to one degree are contemplated.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

As used herein, the term "polymer," such as used in "at least one polymer," can comprise any suitable polymer such as, for example, a polyamide, a polyester, polyurethane, polyvinyl chloride, polylactic acid, polystyrene, modacrylic or a polyolefin, or co-polymers thereof, or a combination thereof.

The term "polyamide," as utilized herein, is defined to be any long-chain polymer in which the linking functional groups are amide (—CO—NH—) linkages. The term polyamide is further defined to include copolymers, terpolymers and the like as well as homopolymers and also includes blends of two or more polyamides. In one example, the polyamide can comprise one or more of nylon 6, nylon 66, nylon 10, nylon 612, nylon 12, nylon 11, or any combination thereof. In another example, the polyamide can comprise nylon 6 or nylon 66. In yet other example, the polyamide is nylon 6. In a yet further example, the polyamide is nylon 66.

The term "polyester," as utilized herein, refers to a composition comprising a long-chain synthetic polymer composed of at least 85% by weight of an ester of a substituted aromatic carboxylic acid, including but not restricted to substituted terephthalic units, $p(-R-O-CO-C_6H_4-CO-O-)_x$ and para substituted hydroxybenzoate units, $p(-R-O-CO-C_6H_4-O-)_x$. The polyester can comprise, for example, polyethylene terephthalate (PET) homopolymers and/or copolymers, polytrimethylene terephthalate (PTT) homopolymers and/or copolymers, polybutylene terephthalate (PBT) homopolymers and/or copolymers, and the like, including those that contain comonomers such as cyclohexanedimethanol, cyclohexanedicarboxylic acid, and the like. For example, a polyester can comprise PET.

As defined herein, the term "polyolefin" refers to any class of polymers produced from a simple olefin (also called an alkene with the general formula $C_nH_{2n}$) as a monomer. The polyolefin can comprise, for example, polyethylene, polypropylene, both homopolymer and/or copolymers, poly (1-butene), poly(3-methyl-1-butene), or poly(4-methyl-1-pentene) and the like, as well as combinations or mixtures of two or more of the foregoing. In one example, the polyolefin can comprise polyethylene or polypropylene. In other example, the polyolefin can comprise polyethylene. In yet other example, the polyolefin can comprise polypropylene.

2. Fiber and Method of Making Same

Disclosed herein is a fiber having a length, wherein the fiber comprises: at least one polymer, and at least one additive, wherein a concentration of the at least one additive in the composition changes along the length of the fiber to provide at least a first location having a first concentration of the at least one additive in the composition, a second location having a second concentration of the at least one additive in the composition, and a third location having a third concentration of the at least one additive in the composition, wherein the second location is positioned between the first location and the third location along the length of the fiber, wherein the second concentration of the at least one additive at the second location is greater than each of the first concentration of the at least one additive at the first location and the third concentration of the at least one additive at the third location.

The fiber is can consist of: at least one polymer, and at least one additive, wherein a concentration of the at least one additive in the composition changes along the length of the fiber to provide at least a first location having a first concentration of the at least one additive in the composition, a second location having a second concentration of the at least one additive in the composition, and a third location having a third concentration of the at least one additive in the composition, wherein the second location is positioned between the first location and the third location along the length of the fiber, wherein the second concentration of the at least one additive at the second location is greater than each of the first concentration of the at least one additive at the first location and the third concentration of the at least one additive at the third location.

Also disclosed here is a fiber having a length, wherein the fiber comprises: at least one polymer, and at least one additive, wherein a concentration of the at least one additive in the composition changes along the length of the fiber to provide at least a first location having a first concentration of the at least one additive in the composition, a second location having a second concentration of the at least one additive in the composition, and a third location having a third concentration of the at least one additive in the composition, wherein the second location is positioned between the first location and the third location along the length of the fiber, wherein the second concentration of the at least one additive at the second location is lower than each of the first concentration of the at least one additive at the first location and the third concentration of the at least one additive at the third location.

The fiber can consist of: at least one polymer, and at least one additive, wherein a concentration of the at least one additive in the composition changes along the length of the fiber to provide at least a first location having a first concentration of the at least one additive in the composition, a second location having a second concentration of the at least one additive in the composition, and a third location having a third concentration of the at least one additive in the composition, wherein the second location is positioned between the first location and the third location along the length of the fiber, wherein the second concentration of the at least one additive at the second location is lower than each of the first concentration of the at least one additive at the first location and the third concentration of the at least one additive at the third location.

Also disclosed is a fiber having a length produced by a method comprising: injecting at least one additive into a polymer flow of a main polymer transfer line to produce a modified polymer flow; and forming, by at least one spinneret, the fiber from the modified polymer flow, wherein injecting the at least one additive into the polymer flow of the main polymer transfer line comprises changing a flow rate of the at least one additive at least twice within fifteen minutes to provide at least a first flow rate, a second flow rate that occurs after the first flow rate, and a third flow rate that occurs after the second flow rate, wherein the second flow rate is greater than each of the first flow rate and the third flow rate. The fiber produced by such a method will have at least a first location having a first concentration of the at least one additive in the composition, a second location having a second concentration of the at least one additive in the composition, and a third location having a third concentration of the at least one additive in the composition, wherein the second location is positioned between the first location and the third location along the length of the fiber, wherein the second concentration of the at least one additive at the second location is lower than each of the first concentration of the at least one additive at the first location and the third concentration of the at least one additive at the third location.

Each fiber disclosed herein can comprise a fourth location along the fiber has a fourth concentration of the at least one additive in the composition, wherein the fourth concentration is different from each of the first concentration, second concentration, and third concentration. In another example, the fourth concentration of the at least one additive is identical to the second concentration. In one example, the fourth location is positioned after the first location, second location, and third location along the length of the fiber. In one example, the concentrations at the first location, second location, third location, and fourth location are repeated at least twice along the length of the fiber.

The first location, second location, and third location disclosed herein can relate to specific locations along the fiber. An example of a fiber with such specific locations is shown in FIG. 1A, where fiber 100 contains a first location 102, a second location 104, and third location 106.

Figure 1B:
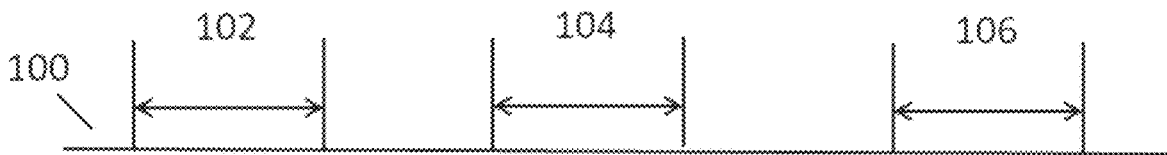
FIG. 1B shows an exemplary fiber disclosed herein with a first location, second location, and third location.
Figure 1C:
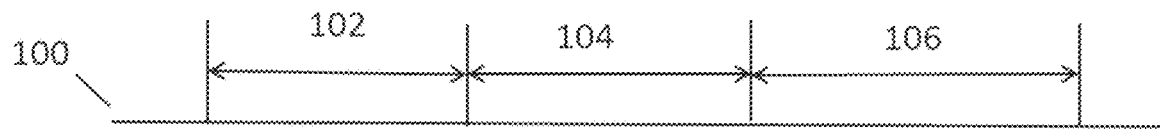
FIG. 1C shows an exemplary fiber disclosed herein with a first location, second location, and third location.

The first location, second location, and third location disclosed herein can also relate to discrete portions along the length of the fiber. The discrete portions can be spaced apart from each other along the length of the fiber as shown in FIG. 1B or be immediately next to each other as shown in FIG. 1C. The discrete portions can, for example, have the same length along the fiber. The discrete portions can, for example, have the different lengths along the fiber. An example of a fiber with such discrete portions spaced apart from each other is shown in FIG. 1B, where fiber 100 contains a first location 102, a second location 104, and third location 106. An example of a fiber with such discrete portions immediately next to each other is shown in FIG. 1C, where fiber 100 contains a first location 102, a second location 104, and third location 106.

As disclosed herein, the first concentration of the at least one additive in the fiber corresponds to the concentration of the at least one additive at the first location along the length of the fiber. Similarly, the second concentration of the at least one additive in the fiber corresponds to the concentration of the at least one additive at the second location along the length of the fiber. Similarly, the third concentration of the at least one additive in the fiber corresponds to the concentration of the at least one additive at the third location along the length of the fiber.

Figure 2:
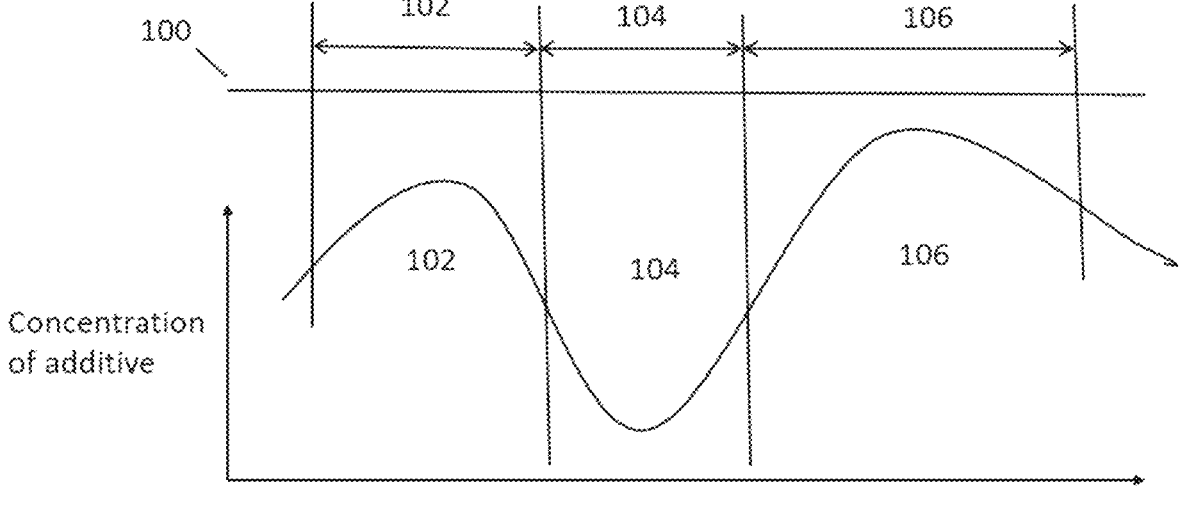
FIG. 2 shows a concentration profile of an exemplary fiber disclosed herein, wherein the fiber has a first location, second location, and third location.

When the first location, second location, and third location are discrete portions along the length of the fiber the first concentration, second concentration, and third concentrations of the at least one additive relate to either a maximum concentration along the length of the discrete portion or a minimum concentration along the length of the fiber. For example, "the second concentration of the at least one additive at the second location is lower than each of the first concentration of the at least one additive at the first location and the third concentration of the at least one additive at the third location" means that minimum concentration of the at least one additive in the first location and third location being discrete portions along the length of the fiber are higher than the maximum concentration of the at least one additive in the second location being a discrete portion along the length of the fiber. A non-limiting example of such a situation is shown in FIG. 2. In FIG. 2, the concentration of the at least one additive is plotted relative to the length of the fiber 100. The minimum concentration of the at least one additive in the first location 102 being a discrete portion along the length of the fiber is higher than the maximum concentration of the at least one additive in the second location 104 being a discrete portion along the length of the fiber. Similarly, the minimum concentration of the at least one additive in the third location 106 being a discrete portion along the length of the fiber is higher than the maximum concentration of the at least one additive in the second location 104 being a discrete portion along the length of the fiber.

Figure 3:
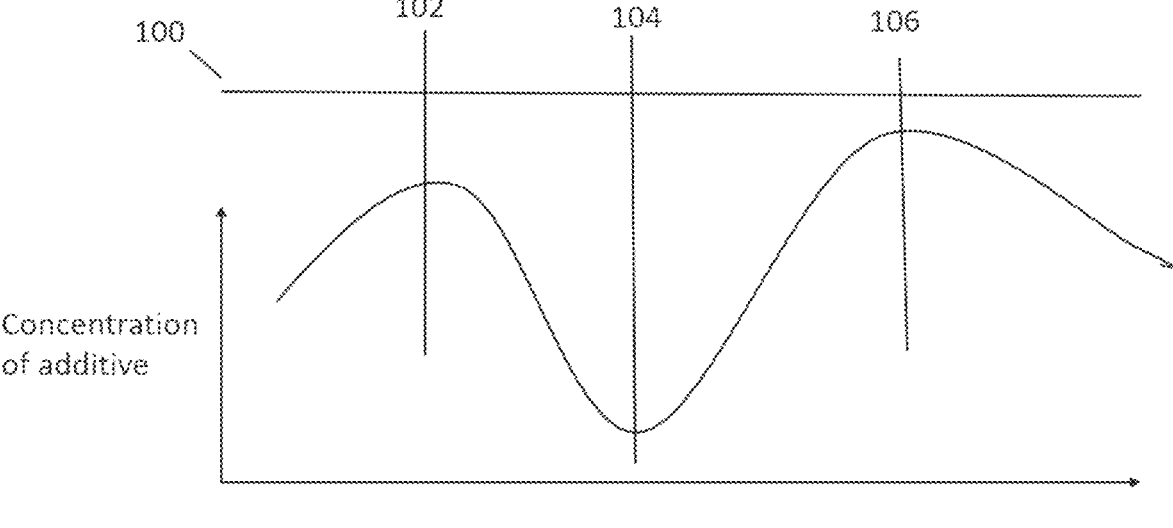
FIG. 3 shows a concentration profile of an exemplary fiber disclosed herein, wherein the fiber has a first location, second location, and third location.
Figure 4A:
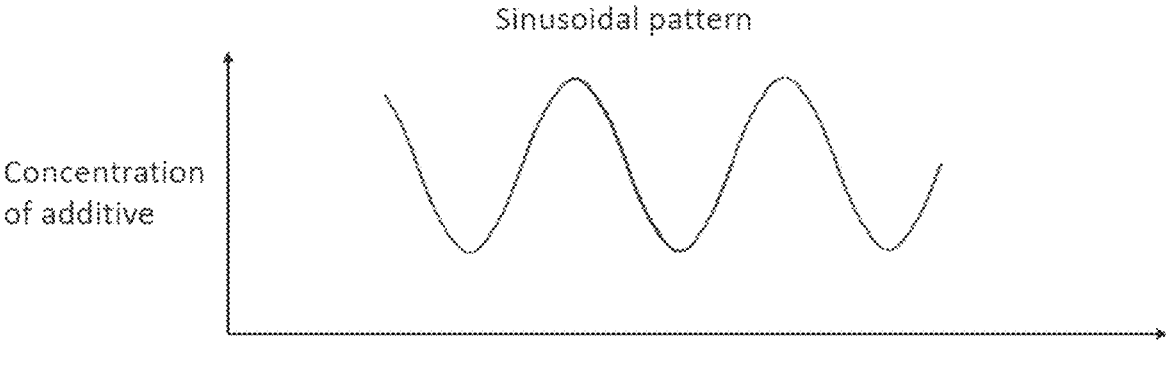
FIGS. 4A-4F show concentration profiles disclosed herein.
Figure 4B:
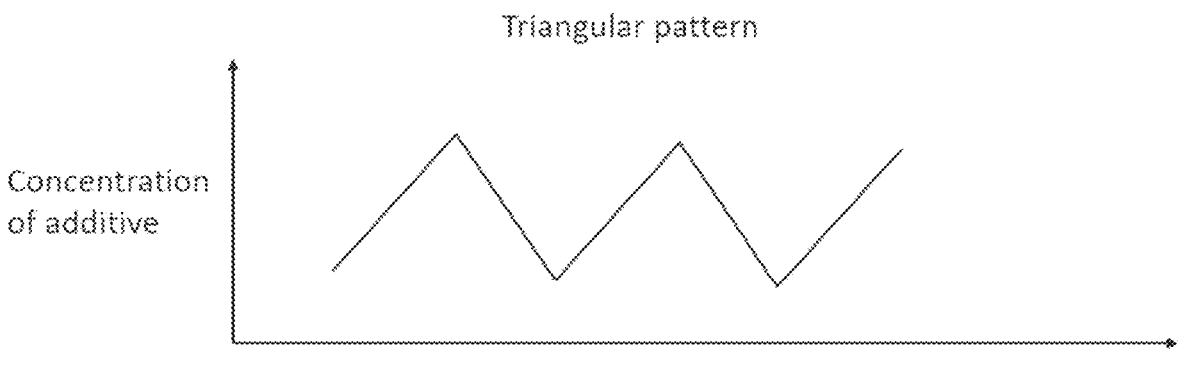
Figure 4C:
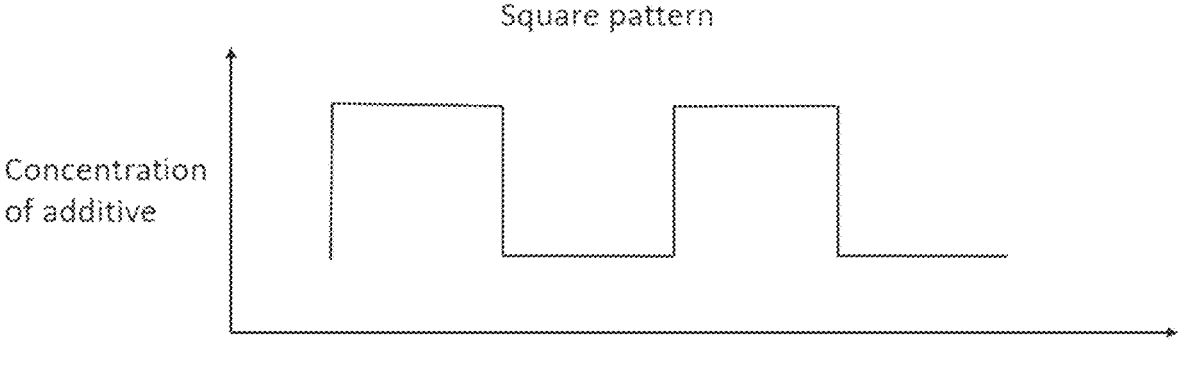
Figure 4D:
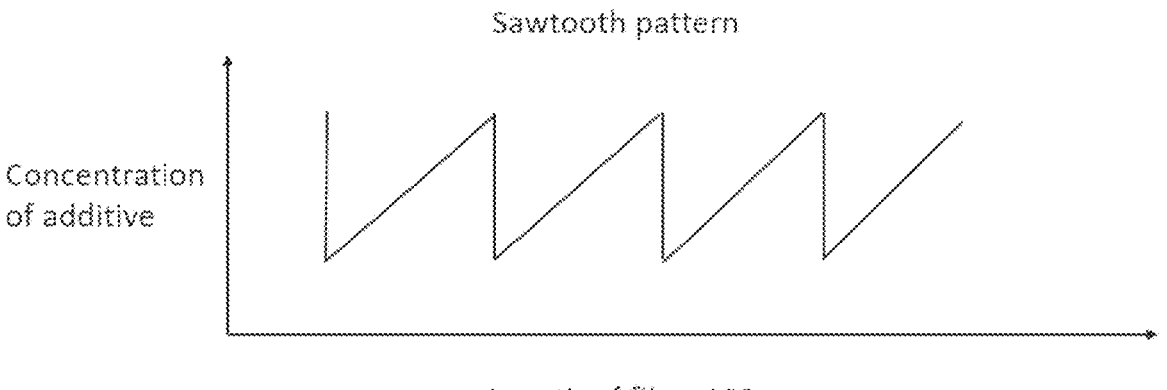
Figure 4E:
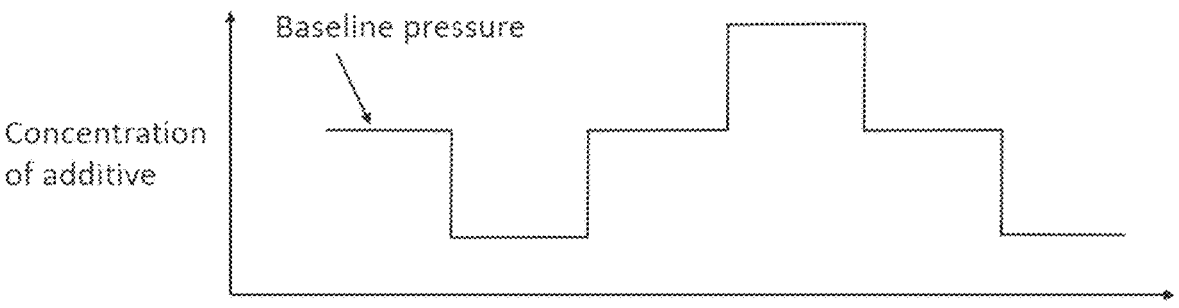
Figure 4F:
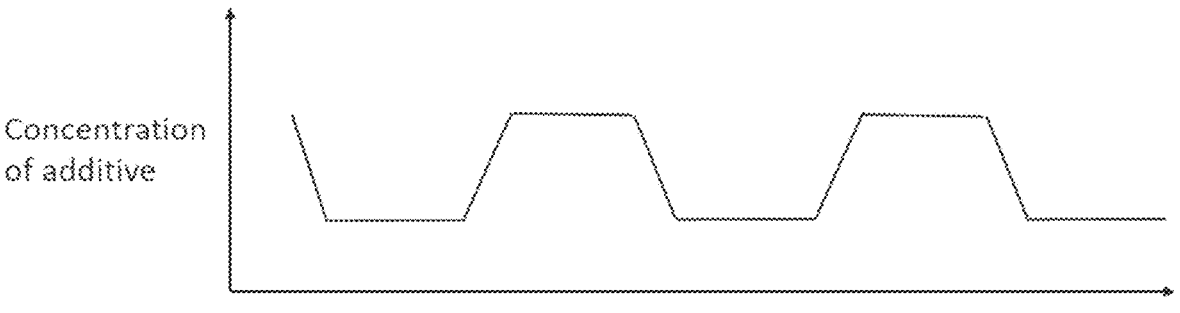

A non-limiting example of a situation when the first location, second location, and third location are specific locations along the fiber is shown in FIG. 3. In FIG. 3, the concentration of the at least one additive is plotted relative to the length of the fiber 100. The concentration of the at least one additive in the first location 102 being a specific location along the length of the fiber is higher than the concentration of the at least one additive in the second location 104 being a specific location along the length of the fiber. Similarly, the concentration of the at least one additive in the third location 106 being a specific location along the length of the fiber is higher than the concentration of the at least one additive in the second location 104 being a specific location along the length of the fiber.

The varying concentration of the at least the one additive long the length of the fiber, as disclosed herein, is a result of the process of making the fiber. The method includes injecting at least one additive into a polymer flow of a main polymer transfer line to produce a modified polymer flow. The flow rate of the at least one additive injected into the polymer flow of the main polymer transfer line is changed at least twice. As such, the concentration of the at least one additive changes in the polymer flow. A fiber produced from such a polymer flow will have varying concentration of the at least one additive along its length. For the fiber disclosed herein the flow rate of the at least on additive injected into the polymer flow of the main polymer transfer line can be lowered from an initial flow rate and subsequently increased. As such, the concentration of the at least one additive is varied in the polymer flow of the main polymer transfer line. The polymer in the modified polymer flow of the main transfer line is transferred to an least one spinneret which produces a fiber from the polymer in the modified polymer flow. As such, the concentration of the at least one additive is varied along the length of the fiber since the concentration of the at least one additive is varied in the polymer in the modified polymer flow. Thus, a higher injection rate of the at least one polymer into the polymer flow in the main polymer transfer line provides for a fiber with a higher concentration of the at least one additive. Similarly, a lower injection rate of the at least one polymer into the polymer flow in the main polymer transfer line provides for a fiber with a lower concentration of the at least one additive. That is, the injection rate of the at least on additive into the polymer flow in the main polymer transfer line determines the concentration of the at least one additive in the fiber that is produced from the polymer with the added at least one additive. As such, the concentration of the at least one additive in the fiber can be changed by changing the injection rate of the at least one additive into the polymer flow of the main polymer transfer line. The injection of the at least one additive into the polymer flow of the main polymer transfer line can be done via an extruder, such as a side-arm extruder that intersects the main polymer transfer line.

Figure 6:
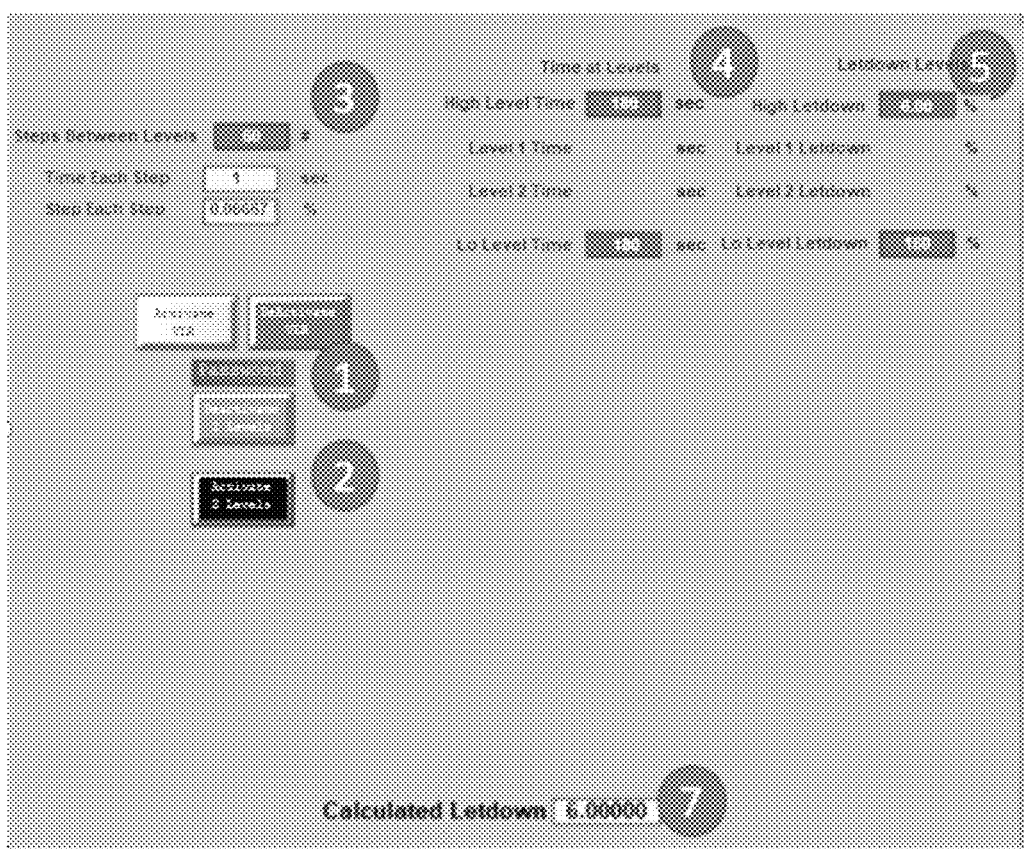
FIG. 6 shows the let down rate profile of an exemplary method performed using the methods disclose herein.
Figure 6:
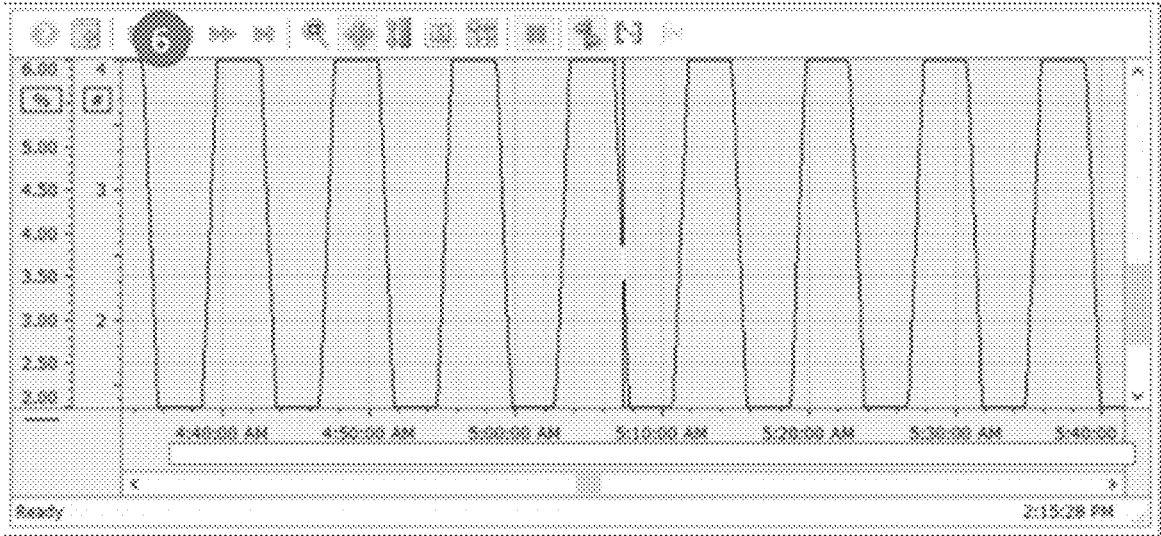

The concentration of the at least one additive in the fiber can correspond to the varying injection rate of the at least one additive into the polymer flow of the main polymer transfer line. The varying injection rate of the at least one additive into the polymer flow of the main polymer transfer line can be random profile. In another example, the varying injection rate of the at least one additive into the polymer flow of the main polymer transfer line can be predetermined profile. In another example, the varying injection rate of the at least one additive into the polymer flow of the main polymer transfer line can be cyclical. In another example, the varying injection rate of the at least one additive into the polymer flow of the main polymer transfer line can be a sinusoidal profile. In another example, the varying injection rate of the at least one additive into the polymer flow of the main polymer transfer line can be a sawtooth profile. In another example, the varying injection rate of the at least one additive into the polymer flow of the main polymer transfer line can be a square profile. In another example, the varying injection rate of the at least one additive into the polymer flow of the main polymer transfer line can be a triangular profile. In another example, the varying injection rate of the at least one additive into the polymer flow of the main polymer transfer line can be varying the injection rate around a baseline injection rate. For example, the injection rate can be increased or decreased from the baseline injection rate. In another example, the varying injection rate of the at least one additive into the polymer flow of the main polymer transfer line can be varying the injection rate to produce a profile with a gradual change between two baselines, see FIG. 4F. FIG. 6 shows a working example of the profile shown in FIG. 4F where the concentration profile with respect to the let down rate is changed gradually between let down rates of 2% and 6%. Examples of the varying injection rates is shown in FIGS. 4A-4F. It is understood that the concentration of the at least one additive in the fiber will generally correspond to the varying injection rate of the at least one additive into the main polymer transfer line. However, it is also understood that the profile of the concentration of the at least one additive in the fiber might not perfectly follow the varying injection rate since the mixing of the at least one additive with the polymer in the polymer flow can cause the profile to be less defined due to migration of the at least one additive in the polymer.

In one example, the concentration of the at least one additive changes constantly along at least a portion of the length of the fiber. In another example, the concentration of the at least one additive is constant for at least a first portion of the length of the fiber. The portion of the length of the fiber can be at least 5%, 10%, 15%, 20%, 25%, 30%, 35%, 40%, 50%, 60%, or 70% of the total length of the fiber.

In another example, the concentration of the at least one additive changes constantly along an entire length of the fiber.

A change in flow rate of the at least one additive injected into the polymer flow of the main polymer transfer line can be a 1% to 500% change of flow rate. The change in flow rate of the at least on additive can be a change in the let down rate of the at least one additive. The term "let down rate" is defined as an injection rate of the at last one additive into the polymer flow of the main polymer transfer line that results in a percentage of the at least one additive being present in the final fiber produced from the modified polymer flow in the main polymer transfer line. For example, a 4% let down rate means that the injection rate of the at least one additive into the polymer flow of the main polymer transfer line is such that the fiber produced from the resulting modified polymer flow contains 4% by weight of the at least one additive. The change in flow rate can be an increase or a decrease in flow rate. The change in flow rate can be an increase or a decrease in the let down rate. For example, the change in flow rate can be an increase in flow rate. In another example, the change in flow rate can be an increase in the let down rate. In another example, change in flow rate can be a decrease in flow rate. In another example, change in flow rate can be a decrease in the let down rate. For example, if the initial flow rate of the at least one additive can be a let down rate from 2% to 10%, then a change in flow rate can be a let down rate that is from 1% to 500% higher or lower than the initial flow rate. Thus, if the initial let down rate is 2% and the let down rate is increased with 500%, then the let down rate is 10% after the 500% increase of the let down rate. In one example, the let down rate of the at least one additive can be from 1% to 30%, for example from 2% to 15%. As such, there can be a 1% to 500% change in the let down rate being 2% to 15%. In another example, the let down rate of the at least one additive can be from 2% to 10%. In another example, the let down rate of the at least one additive can be from 3% to 8%.

In another example, a change in flow rate of the at least one additive injected into the polymer flow of the main polymer transfer line can be a 50% to 500% change of the let down rate. In another example, a change in flow rate of the at least one additive injected into the polymer flow of the main polymer transfer line can be a 100% to 500% change of the let down rate. In another example, a change in flow rate of the at least one additive injected into the polymer flow of the main polymer transfer line can be a 150% to 500% change of the let down rate. In another example, a change in flow rate of the at least one additive injected into the polymer flow of the main polymer transfer line can be a 200% to 500% change of the let down rate. In another example, a change in flow rate of the at least one additive injected into the polymer flow of the main polymer transfer line can be a 250% to 500% change of the let down rate. In another example, a change in flow rate of the at least one additive injected into the polymer flow of the main polymer transfer line can be a 300% to 500% change of the let down rate. In another example, a change in flow rate of the at least one additive injected into the polymer flow of the main polymer transfer line can be a 350% to 500% change of the let down rate. In another example, a change in flow rate of the at least one additive injected into the polymer flow of the main polymer transfer line can be a 10% to 400% change of the let down rate. In another example, a change in flow rate of the at least one additive injected into the polymer flow of the main polymer transfer line can be a 10% to 300% change of the let down rate. In another example, a change in flow rate of the at least one additive injected into the polymer flow of the main polymer transfer line can be a 10% to 250% change of the let down rate. In another example, a change in flow rate of the at least one additive injected into the polymer flow of the main polymer transfer line can be a 10% to 200% change of the let down rate. In another example, a change in flow rate of the at least one additive injected into the polymer flow of the main polymer transfer line can be a 50% to 400% change of the let down rate. In another example, a change in flow rate of the at least one additive injected into the polymer flow of the main polymer transfer line can be a 100% to 350% change of the let down rate. In another example, a change in flow rate of the at least one additive injected into the polymer flow of the main polymer transfer line can be a 50% to 300% change of the let down rate. In another example, a change in flow rate of the at least one additive injected into the polymer flow of the main polymer transfer line can be a 50% to 250% change of the let down rate.

In another example, a change in flow rate of the at least one additive injected into the polymer flow of the main polymer transfer line can be a 50% to 500% increase of the let down rate. In another example, a change in flow rate of the at least one additive injected into the polymer flow of the main polymer transfer line can be a 100% to 500% increase of the let down rate. In another example, a change in flow rate of the at least one additive injected into the polymer flow of the main polymer transfer line can be a 150% to 500% increase of the let down rate. In another example, a change in flow rate of the at least one additive injected into the polymer flow of the main polymer transfer line can be a 200% to 500% increase of the let down rate. In another example, a change in flow rate of the at least one additive injected into the polymer flow of the main polymer transfer line can be a 250% to 500% increase of the let down rate. In another example, a change in flow rate of the at least one additive injected into the polymer flow of the main polymer transfer line can be a 300% to 500% increase of the let down rate. In another example, a change in flow rate of the at least one additive injected into the polymer flow of the main polymer transfer line can be a 350% to 500% increase of the let down rate. In another example, a change in flow rate of the at least one additive injected into the polymer flow of the main polymer transfer line can be a 10% to 400% increase of the let down rate. In another example, a change in flow rate of the at least one additive injected into the polymer flow of the main polymer transfer line can be a 10% to 300% increase of the let down rate. In another example, a change in flow rate of the at least one additive injected into the polymer flow of the main polymer transfer line can be a 10% to 250% increase of the let down rate. In another example, a change in flow rate of the at least one additive injected into the polymer flow of the main polymer transfer line can be a 10% to 200% increase of the let down rate. In another example, a change in flow rate of the at least one additive injected into the polymer flow of the main polymer transfer line can be a 50% to 400% increase of the let down rate. In another example, a change in flow rate of the at least one additive injected into the polymer flow of the main polymer transfer line can be a 100% to 350% increase of the let down rate. In another example, a change in flow rate of the at least one additive injected into the polymer flow of the main polymer transfer line can be a 50% to 300% increase of the let down rate. In another example, a change in flow rate of the at least one additive injected into the polymer flow of the main polymer transfer line can be a 50% to 250% increase of the let down rate. For example, if the let down rate is 2% and the let down rate is increased 50% to 500%, then the changed let down rate is from 3% (2%+50% increase) to 10% (2%+500% increase).

In another example, a change in flow rate of the at least one additive injected into the polymer flow of the main polymer transfer line can be a 1% to 99% decrease of the let down rate. In another example, a change in flow rate of the at least one additive injected into the polymer flow of the main polymer transfer line can be a 10% to 90% decrease of the let down rate. In another example, a change in flow rate of the at least one additive injected into the polymer flow of the main polymer transfer line can be a 10% to 80% decrease of the let down rate. In another example, a change in flow rate of the at least one additive injected into the polymer flow of the main polymer transfer line can be a 10% to 70% decrease of the let down rate. In another example, a change in flow rate of the at least one additive injected into the polymer flow of the main polymer transfer line can be a 10% to 60% decrease of the let down rate. In another example, a change in flow rate of the at least one additive injected into the polymer flow of the main polymer transfer line can be a 10% to 50% decrease of the let down rate. In another example, a change in flow rate of the at least one additive injected into the polymer flow of the main polymer transfer line can be a 10% to 40% decrease of the let down rate. In another example, a change in flow rate of the at least one additive injected into the polymer flow of the main polymer transfer line can be a 20% to 90% decrease of the let down rate. In another example, a change in flow rate of the at least one additive injected into the polymer flow of the main polymer transfer line can be a 30% to 90% decrease of the let down rate. In another example, a change in flow rate of the at least one additive injected into the polymer flow of the main polymer transfer line can be a 30% to 80% increase of the let down rate. In another example, a change in flow rate of the at least one additive injected into the polymer flow of the main polymer transfer line can be a 30% to 70% decrease of the let down rate. In another example, a change in flow rate of the at least one additive injected into the polymer flow of the main polymer transfer line can be a 20% to 60% decrease of the let down rate. In another example, a change in flow rate of the at least one additive injected into the polymer flow of the main polymer transfer line can be a 40% to 60% decrease of the let down rate. In another example, a change in flow rate of the at least one additive injected into the polymer flow of the main polymer transfer line can be a 20% to 70% decrease of the let down rate. For example, if the let down rate is 10% and the let down rate is decreased 10% to 90%, then the changed let down rate is from 9% (10%-10% decrease) to 1% (10%-90% decrease).

Figure 5:
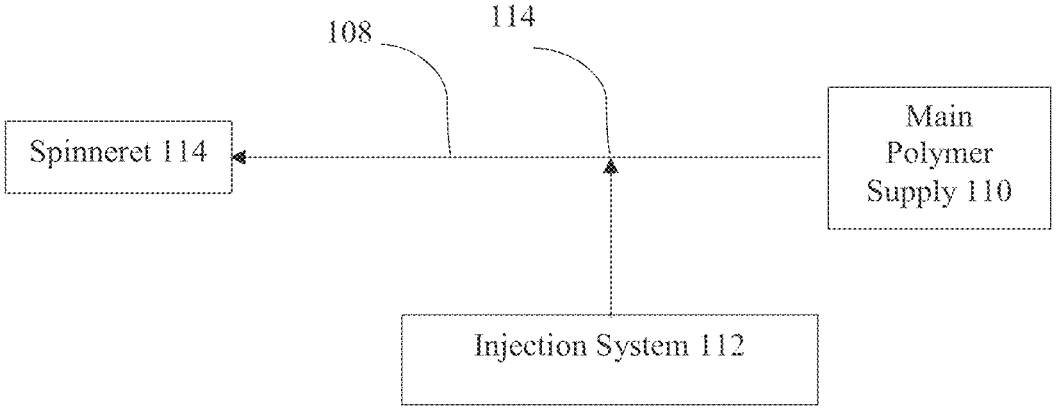
FIG. 5 shows a system capable of producing the fibers disclosed here and performing the methods disclosed herein.

With reference to FIG. 5, the polymer flow in the main polymer transfer line 108 can be produced by an extruder that extrudes the polymer in the polymer flow from a main polymer supply 110, such as a hopper. An injection system 112, such as a side-arm extruder, injects the at least one additive into the main polymer transfer line 108 at location 114. The polymer with the at least one additive can be mixed in the main polymer transfer line 108 with a mixing device, such as a static mixer, to ensure that the polymer and the at least one additive are homogenously mixed. The main polymer transfer line transfer the mixture of polymer and the at least one additive to at least one spinneret 114, which produces the fiber.

In one example, the at least one additive can enter the main polymer transfer line 108 in a direction that is opposite a flow direction of the main polymer transfer line 108. Injecting the at least one additive in contra-flow to the flow direction of the primary polymer melt (counter-current) can cause the molten color to be split up into a plurality of streams that then reverse flow to pass through to mixing device, such as one or more static mixers, in the flow direction.

In another example, the at least one additive can enter the main polymer transfer line 108 co-current to the flow or perpendicular to or at any other angle relative to the direction of the flow through the main polymer transfer line 108, and one or more mixers (e.g., a static mixer) downstream can mix the at least one additive with the polymer from the a main polymer supply 110.

The polymer from the a main polymer supply 110 can be a polyamide, a polyester, polyurethane, polyvinyl chloride, polylactic acid, polystyrene, modacrylic or a polyolefin, or co-polymers thereof, or a combination thereof. Thus, the resulting fiber can comprise a polyamide, a polyester, polyurethane, polyvinyl chloride, polylactic acid, polystyrene, modacrylic or a polyolefin, or co-polymers thereof, or a polyolefin, or a combination thereof. For example, the polymer can be a polyamide. The polyamide can be nylon 6, nylon 66, nylon 10, nylon 612, nylon 12, or nylon 11, or any combination thereof. In another example, the polyamide can comprise nylon 6 or nylon 66. In yet other example, the polyamide is nylon 6. In a yet further example, the polyamide is nylon 66.

In another example, the polymer can be a polyester. The polyester can comprise, for example, polyethylene terephthalate (PET) homopolymers and/or copolymers, polytrimethylene terephthalate (PTT) homopolymers and/or copolymers, polybutylene terephthalate (PBT) homopolymers and/or copolymers, and the like, including those that contain comonomers such as cyclohexanedimethanol, cyclohexanedicarboxylic acid, and the like. For example, the polyester can comprise PET.

In another example, the polymer can be a polyolefin. The polyolefin can comprise, for example, polyethylene, polypropylene, both homopolymer and/or copolymers, poly(1-butene), poly(3-methyl-1-butene), or poly(4-methyl-1-pentene) and the like, as well as combinations or mixtures of two or more of the foregoing. In one example, the polyolefin can comprise polyethylene or polypropylene. In other example, the polyolefin can comprise polyethylene. In yet other example, the polyolefin can comprise polypropylene.

In one example, the at least on colorant can comprise at least one additive is configured to affect at least one of: a luster of a yarn formed by a plurality of fibers disclosed herein; an absorptivity of a dye; or a shape of yarn formed by a plurality of fibers disclosed herein. In another example, the at least one additive can comprise a colorant, a deep dye additive, a light dye additive, $TiO_2$, a UV stabilizer, a processing aid, or a process stabilizer, or a combination thereof. It is understood that the at least one additive can be a mixture of a polymer and a colorant, a deep dye additive, a light dye additive, $TiO_2$, a UV stabilizer, a processing aid, or a process stabilizer, or a combination thereof. The polymer can be a polymer disclosed herein. The injection device can be an extruder that mixes the polymer and the colorant, the deep dye additive, the light dye additive, $TiO_2$, the UV stabilizer, the processing aid, or the process stabilizer, or a combination thereof to create a flow of the at least one additive, which is injected into the polymer flow of the main polymer transfer line. The at least one additive can comprise a colorant. The colorant can comprise a color pigment (e.g., an additive that, when mixed with polymer, at least partially controls a color of the polymer), such as a colored polymer melt concentrate. Thus, for example, the at least one additive can comprise a colored polymer melt concentrate. When added to the polymer in the main polymer transfer line, the colored polymer melt concentrate can mix, such as mix homogenously, with the polymer in the main polymer transfer line. The polymer in the main polymer transfer line can be free of the at least one additive prior to the at least one additive being injected into the main polymer transfer line. For example, the polymer in the main polymer transfer line can be uncolored, which means it is free from colorant prior to being injected with the at least one additive comprising a colorant.

For example, the polymer of the polymer flow in the main polymer transfer line can be identical to a polymer present in the at least one additive. For example, if the polymer of the polymer flow in the main polymer transfer line is a polyamide then the polymer in the at least one additive can also be a polyamide.

The fiber can have a thickness, wherein the at least one additive is mixed through the thickness the fiber. In one example, the at least one additive is homogenously mixed through the thickness of the fiber. The fiber can have thickness of suitable to make yarn. For example, the fiber can have a thickness from 1 to 50 denier per filament, for example, from 2 to 30 denier per filament, from 10 to 30 denier per filament or from 10 to 20 denier per filament.

Also disclosed herein is a yarn comprising a plurality of fibers disclosed herein.

Also disclosed herein is a carpet comprising a face fiber being one or more fibers disclosed herein.

Also disclosed herein is an article comprising a backing and a plurality of yarns tufted through the backing, wherein at least one yarn of the plurality of yarns is a yarn comprises a plurality of fibers disclosed herein. For example, each yarn of the plurality of yarns can be a yarn comprising a plurality of fibers disclosed herein.

The backing can be a primary backing. The article can comprise a primary and a secondary backing, wherein the plurality of yarns are tufted though the primary backing. The primary backing and secondary backing can be held together via a precoat.

The article can be a carpet. In another example, the article can be suitable for use outdoors. For example, the article can be synthetic turf.

Also disclosed herein is a method comprising:

injecting at least one additive into a polymer flow of a main polymer transfer line to produce a modified polymer flow; and forming, by at least one spinneret, at least one fiber from the modified polymer flow, wherein injecting the at least one additive into the polymer flow of the main polymer transfer line comprises changing a flow rate of the at least one additive at least twice within fifteen minutes to provide at least a first flow rate, a second flow rate that occurs after the first flow rate, and a third flow rate that occurs after the second flow rate, wherein the second flow rate is greater than each of the first flow rate and the third flow rate, or wherein the second flow rate is lower than each of the first flow rate and the third flow rate. Also disclosed herein is a fiber produced by the method. The fiber can be a fiber disclosed herein.

Changing the flow rate of the at least one additive can be changing the let down rate of the one additive. Thus, the disclosed method can comprise:

injecting at least one additive into a polymer flow of a main polymer transfer line to produce a modified polymer flow; and forming, by at least one spinneret, at least one fiber from the modified polymer flow, wherein injecting the at least one additive into the polymer flow of the main polymer transfer line comprises changing a let down rate of the at least one additive at least twice within fifteen minutes to provide at least a first let down rate, a second let down rate that occurs after the first flow rate, and a third let down rate that occurs after the second let down rate, wherein the second let down rate is greater than each of the first let down rate and the third let down rate, or wherein the second let down rate is lower than each of the first let down rate and the third let down rate.

In one example, the second flow rate is greater than each of the first flow rate and the third flow rate. In another example, second flow rate is lower than each of the first flow rate and the third flow rate.

In one aspect, the method can further comprise further changing the flow rate after the third flow rate to provide for a fourth flow rate, wherein the fourth flow rate is greater than the third flow rate when the second flow rate is greater than the third flow rate, or the fourth flow rate is lower than the third flow rate when the second flow rate is lower than the third flow rate. In one example, the method can further comprise further changing the flow rate after the third flow rate to provide for a fourth flow rate, wherein the fourth flow rate is greater than the third flow rate when the second flow rate is greater than the third flow rate. In another example, method can further comprise further changing the flow rate after the third flow rate to provide for a fourth flow rate, wherein the fourth flow rate is lower than the third flow rate when the second flow rate is lower than the third flow rate.

The method disclosed herein can produce a profile when the injection rate is changed. As such, the method can comprise continuously changing the flow rate of the at least one additive, wherein such change comprises changing the flow rate according to a sinusoidal profile, a triangular profile, a square profile, a random profile, a profile varying around a baseline injection rate, or a sawtooth profile. It one example, the profile can be a random profile. In another example, the profile can be a sawtooth profile. In another example, the profile can be a sinusoidal profile. In another example, the profile can be a triangular profile. In another example, the profile can be a square profile. In another example, the profile can be a profile that varies around a baseline injection rate.

In one example, the method comprises changing the flow rate of the at least one additive at least twice within fifteen minutes comprises continuously changing the flow rate of the at least one additive.

In one example, the method comprises changing the flow rate of the at least one additive at least three times within fifteen minutes. In another example, the method comprises changing the flow rate of the at least one additive at least four times within fifteen minutes. In another example, the method comprises changing the flow rate of the at least one additive at least five times within fifteen minutes. In another example, the method comprises changing the flow rate of the at least one additive at least six times within fifteen minutes.

In one aspect, the method comprises changing the flow rate of the at least one additive at least three times. In another example, the method comprises changing the flow rate of the at least one additive at least four times. In another example, the method comprises changing the flow rate of the at least one additive at least five times. In another example, the method comprises changing the flow rate of the at least one additive at least six times. In another example, the method comprises changing the flow rate of the at least one additive at least ten times. In another example, the method comprises changing the flow rate of the at least one additive at least fifteen times. In another example, the method comprises changing the flow rate of the at least one additive at least twenty times. In another example, the method comprises changing the flow rate of the at least one additive at least thirty times.

In one aspect, the method comprises continuously changing the flow rate of the at least one additive, wherein continuously changing the flow rate of the at least one additive comprises: generating, by a controller, a randomized letdown profile, wherein the randomized letdown profile corresponds to a flow rate over time of the at least one additive; and injecting the at least one additive into the polymer flow according to the letdown profile. The letdown profile can correspond to a sinusoidal profile, a triangular profile, a square profile, a random profile, a profile varying around a baseline injection rate, or a sawtooth profile, as disclosed herein.

In one aspect, the method comprises changing the flow rate of the at least one additive at least twice within fifteen minutes, wherein changing the flow rate of the at least one additive at least twice within fifteen minutes comprises holding the flow rate of the at least one additive constant for at least one fixed duration. In one example, the method can comprise randomly generating, by a controller, the at least one fixed duration. The at least one fixed duration can be predetermined according to a predetermined routine. The at least one fixed duration can comprise a first duration and a second duration that is different than the first duration. The at least one duration of the at least one fixed durations is between 30 seconds and 5 minutes. For example, the at least one duration of the at least one fixed durations is between 1 minute and 5 minutes. In another example, the at least one duration of the at least one fixed durations is between 2 minute and 5 minutes. In another example, the at least one duration of the at least one fixed durations is between 3 minute and 5 minutes. In another example, the at least one duration of the at least one fixed durations is between 30 seconds and 4 minutes. In another example, the at least one duration of the at least one fixed durations is between 30 seconds and 3 minutes. In another example, the at least one duration of the at least one fixed durations is between 30 seconds and 2 minutes.

In one aspect, the method comprises changing the flow rate of the at least one additive at least twice within fifteen minutes, wherein changing the flow rate of the at least one additive at least twice within fifteen minutes comprises: during a first period, continuously changing the flow rate of the at least one additive; and during a second period, holding the flow rate of the at least one additive constant for at least one fixed duration.

In one aspect, the method can further comprise injecting at least one second additive into the modified polymer flow. For example, the method can further comprise injecting at least one second additive and a third additive into the modified polymer flow.

In one aspect, the polymer flow is a polymer flow free from additives.

In one aspect, the polymer flow is a polymer flow contains at least one additive. The additive in the polymer flow can be identical or different from the at least one additive injected into the polymer flow to produce the modified polymer flow.

In one aspect, the polymer flow can be produced from virgin polymer. In another example, the polymer flow can be produced from recycled polymer.

In one aspect, wherein the step of forming, by at least one spinneret, at least one fiber from the modified polymer flow comprises forming a yarn comprising a plurality of fibers.

3. Examples

The following examples are put forth so as to provide those of ordinary skill in the art with a complete disclosure and description of how the compounds, compositions, articles, devices, and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Fibers were produced according to methods disclosed herein. A polymer color concentrate was used as the at least one additive in this example. As shown in FIG. 6, the let down rate of the polymer color concentrate was varied between 2% and 6%. The let down rate was varied between 2% and 6% by increasing or decreasing the let down rate 0.0666% each second for 60 seconds, as indicated at 3 in FIG. 6. The let down rate was held constant at 2% and 6% for 180 seconds before gradually changing the let down rate, as shown at 4 and 5 in FIG. 6. 6 in FIG. 6 shows the profile of the let down rate, and 7 shows the calculated let down rate. In FIG. 6, starting from the first cycle of the let down rate being 2%; A. the let down rate was held at 2% for 180 seconds; B. the let down rate was then increased 0.0666% each second for 60 seconds until it reaches 6%; C. the let down rate was held at 6% for 180 seconds; D. the let down rate was then decreased 0.0666% each second for 60 seconds until it reaches 2%; and repeating steps A-D in sequential order.

Figure 7:
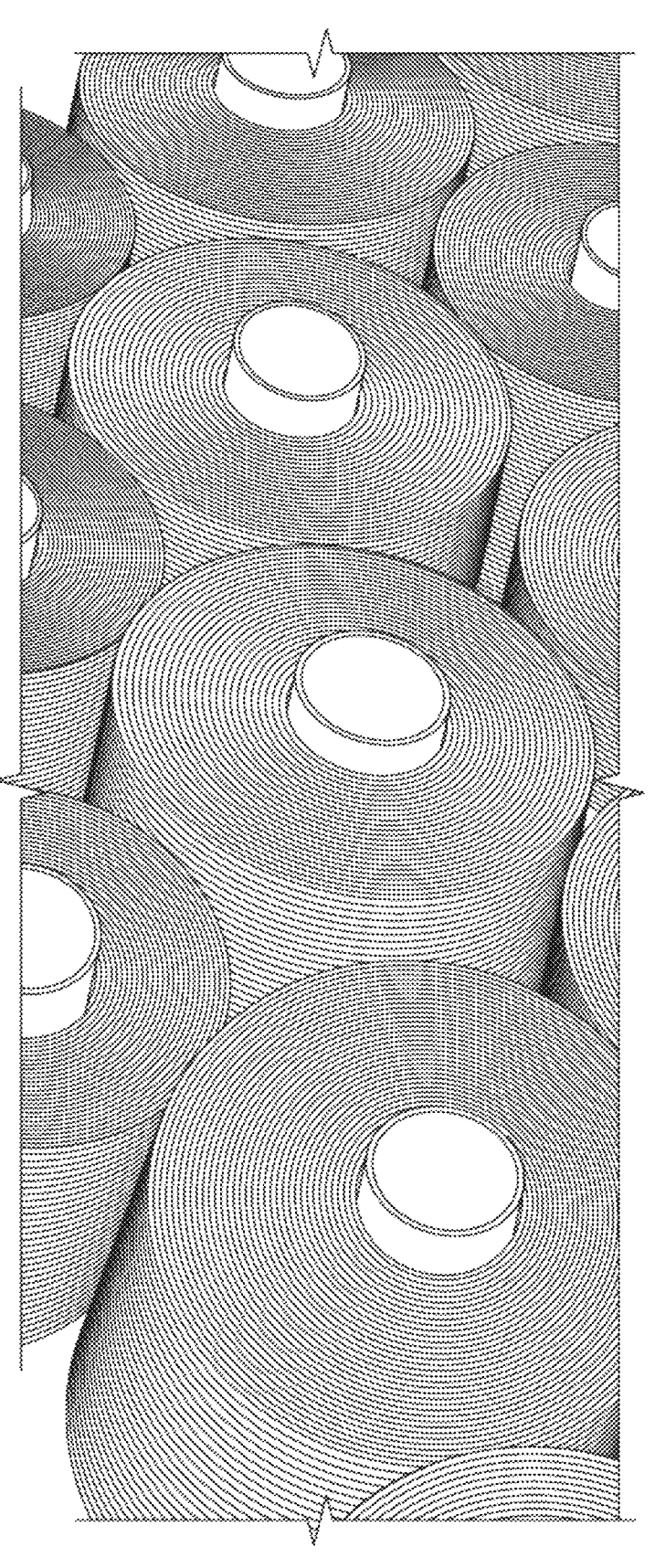
FIG. 7 shows rolls of yarn made of fiber disclosed herein.

The fiber that were produced by this example was made into rolls of yarn as shown in FIG. 7.

4. Aspects

In view of the described device, systems, and methods and variations thereof, herein below are certain more particularly described aspects of the invention. These particularly recited aspects should not, however, be interpreted to have any limiting effect on any different claims containing different or more general teachings described herein, or that the "particular" aspects are somehow limited in some way other than the inherent meanings of the language literally used therein.

Aspect 1: A method comprising: injecting at least one additive into a polymer flow of a main polymer transfer line to produce a modified polymer flow; and forming, by at least one spinneret, at least one fiber from the modified polymer flow, wherein injecting the at least one additive into the polymer flow of the main polymer transfer line comprises changing a flow rate of the at least one additive at least twice within fifteen minutes to provide at least a first flow rate, a second flow rate that occurs after the first flow rate, and a third flow rate that occurs after the second flow rate, wherein the second flow rate is greater than each of the first flow rate and the third flow rate, or wherein the second flow rate is lower than each of the first flow rate and the third flow rate.

Aspect 2: The method of aspect 1, wherein the wherein the second flow rate is greater than each of the first flow rate and the third flow rate.

Aspect 3: The method of aspect 1, wherein the second flow rate is lower than each of the first flow rate and the third flow rate.

Aspect 4: The method of any one of aspects 1-3, wherein changing the flow rate of the at least one additive at least twice within fifteen minutes comprises continuously changing the flow rate of the at least one additive.

Aspect 5: The method of aspect 4, wherein continuously changing the flow rate of the at least one additive comprises changing the flow rate according to a sinusoidal profile, a triangular profile, or a sawtooth profile.

Aspect 6: The method of aspect 4 or aspect 5, wherein continuously changing the flow rate of the at least one additive comprises: generating, by a controller, a randomized letdown profile, wherein the randomized letdown profile corresponds to a flow rate over time of the at least one additive; and injecting the at least one additive into the polymer flow according to the letdown profile.

Aspect 7: The method of any one of aspects 1-6, wherein changing the flow rate of the at least one additive at least twice within fifteen minutes comprises holding the flow rate of the at least one additive constant for at least one fixed duration.

Aspect 8: The method of aspect 7, further comprising randomly generating, by a controller, the at least one fixed duration.

Aspect 9: The method of aspect 7, further wherein the at least one fixed duration is predetermined according to a predetermined routine.

Aspect 10: The method of any one of aspects 7-9, wherein the at least one fixed duration comprises a first duration and a second duration that is different than the first duration.

Aspect 11: The method of any one of aspects 7-10, wherein at least one duration of the at least one fixed durations is between 30 seconds and 5 minutes.

Aspect 12: The method of any one of the preceding aspects, wherein changing the flow rate of the at least one additive at least twice within fifteen minutes comprises: during a first period, continuously changing the flow rate of the at least one additive; and during a second period, holding the flow rate of the at least one additive constant for at least one fixed duration.

Aspect 13: The method of any one of the preceding aspects, wherein at least one additive comprises a colorant.

Aspect 14: The method of aspect 13, wherein the colorant comprises a color pigment.

Aspect 15: The method of any one of the preceding aspects, wherein the at least one additive is configured to affect at least one of: a luster of the at least one fiber; an absorptivity of a dye; or a shape of the at least one fiber.

Aspect 16: The method of any one of the preceding aspects, further comprising injecting at least one second additive into the modified polymer flow.

Aspect 17: The method of any one of the preceding aspects, wherein the polymer flow has a first pigment mixed therein.

Aspect 18: The method of any one of the preceding aspects, wherein injecting the at least one additive into the polymer flow of the main polymer transfer line comprises changing the flow rate of the at least one additive at least three within fifteen minutes to provide at least a fourth flow rate that is different from each of the first flow rate, second flow rate, and third flow rate.

Aspect 19: The method of any one of the preceding aspects, wherein forming, by the at least one spinneret, at least one fiber from the modified polymer flow comprises forming a yarn comprising a plurality of fibers.

Aspect 20: The method of any one of the preceding aspects, wherein each of the first, second, and third flow rates is predetermined.

Aspect 21: The method of any one of the preceding aspects, changing the flow rate of the at least one additive at least twice within fifteen minutes comprises changing the let down rate of the at least one additive at least twice within fifteen minutes to provide at least a first let down rate, a second let down rate that occurs after the first let down rate, and a third let down rate that occurs after the second let down rate, wherein the second let down rate is greater than each of the first let down rate and the third let down rate, or wherein the second let down rate is lower than each of the first let down rate and the third let down rate.

Aspect 22: A fiber having a length, the fiber comprising: a composition comprising: at least one polymer; and at least one additive, wherein a concentration of the at least one additive in the composition changes along the length of the fiber to provide at least a first location having a first concentration of the at least one additive in the composition, a second location having a second concentration of the at least one additive in the composition, and a third location having a third concentration of the at least one additive in the composition, wherein the second location is positioned between the first location and the third location along the length of the fiber, wherein the second concentration of the at least one additive at the second location is greater than each of the first concentration of the at least one additive at the first location and the third concentration of the at least one additive at the third location.

Aspect 23: The fiber of aspect 22, wherein the fiber has thickness, wherein the at least one additive is mixed through the thickness the fiber.

Aspect 24: The fiber of aspect 23, wherein the at least one additive is homogenously mixed through the thickness of the fiber.

Aspect 25: The fiber of any one of aspects 22-24, wherein the concentration of the at least one additive changes constantly along at least a portion of the length of the fiber.

Aspect 26: The fiber of aspect 25, wherein concentration of the at least one additive changes constantly along an entire length of the fiber.

Aspect 27: The fiber of any one of aspects 22-26, wherein the concentration of the at least one additive is constant for at least a first portion of the length of the fiber.

Aspect 28: The fiber of any one of aspects 22-27, wherein at least one additive comprises a colorant.

Aspect 29: The fiber of any one of aspects 22-28, wherein the colorant comprises a color pigment.

Aspect 30: The fiber of any one of aspects 22-29, wherein the at least one additive is configured to affect at least one of: a luster of the yarn; an absorptivity of a dye; or a shape of the yarn.

Aspect 31: The fiber of any one of aspects 22-30, wherein a fourth location along the fiber has a fourth concentration of the at least one additive in the composition, wherein the fourth concentration is different from each of the first concentration, second concentration, and third concentration.

Aspect 32: The fiber of any one of aspects 22-31, wherein the fiber is a first fiber of a plurality of fibers of a yarn.

Aspect 33: A fiber formed by the method of any one of aspects 1-21.

Aspect 34: An article comprising: a backing; and a plurality of yarns tufted through the backing, wherein at least one yarn of the plurality of yarns is a yarn comprising a plurality of fibers as in any one of aspects 22-33.

Aspect 35: The article of aspect 33, wherein each yarn of the plurality of yarns is a yarn comprising a plurality of fibers as in any one of aspects 22-33.

Those skilled in the art will recognize, or be able to ascertain using no more than routine experimentation, many equivalents to the specific embodiments of the method and compositions described herein. Such equivalents are intended to be encompassed by the following claims.

What is claimed is:

1. A method comprising:

injecting a first additive into a polymer flow of a main polymer transfer line to produce a modified polymer flow, wherein injecting the first additive into the polymer flow of the main polymer transfer line comprises changing a flow rate of the first additive at least twice within fifteen minutes to provide at least a first flow rate, a second flow rate that occurs after the first flow rate, and a third flow rate that occurs after the second flow rate, wherein the second flow rate is greater than each of the first flow rate and the third flow rate, or wherein the second flow rate is lower than each of the first flow rate and the third flow rate, wherein the first, second, and third flow rates are positive flow rates; and forming, by at least one spinneret, at least one fiber from the modified polymer flow, wherein, after forming the at least one fiber, the at least one fiber has a length and a color pattern along the length due to changing the flow rate the first additive in the modified polymer flow.

2. The method of claim 1, wherein the wherein the second flow rate is greater than each of the first flow rate and the third flow rate.

3. The method of claim 1, wherein the second flow rate is lower than each of the first flow rate and the third flow rate.

4. The method of claim 1, wherein changing the flow rate of the first additive at least twice within fifteen minutes comprises continuously changing the flow rate of first additive.

5. The method of claim 4, wherein continuously changing the flow rate of the first additive comprises changing the flow rate according to a sinusoidal profile, a triangular profile, or a sawtooth profile.

6. The method of claim 4, wherein continuously changing the flow rate of the first additive comprises:

generating, by a controller, a randomized letdown profile, wherein the randomized letdown profile corresponds to a flow rate over time of the first additive; and injecting the first additive into the polymer flow according to the letdown profile.

7. The method of claim 1, wherein changing the flow rate of the first additive at least twice within fifteen minutes comprises holding the flow rate of the first additive constant for at least one fixed duration.

8. The method of claim 7, further comprising randomly generating, by a controller, the at least one fixed duration.

9. The method of claim 7, further wherein the at least one fixed duration is predetermined according to a predetermined routine.

10. The method of claim 7, wherein the at least one fixed duration comprises a first duration and a second duration that is different than the first duration.

11. The method of claim 7, wherein at least one duration of the at least one fixed durations is between 30 seconds and 5 minutes.

12. The method of claim 1, wherein changing the flow rate of the first additive at least twice within fifteen minutes comprises:

during a first period, continuously changing the flow rate of the first additive; and during a second period, holding the flow rate of the first additive constant for at least one fixed duration.

13. The method of claim 1, wherein first additive comprises a colorant.

14. The method of claim 13, wherein the colorant comprises a color pigment.

15. The method of claim 1, further comprising injecting at least one second additive into the modified polymer flow.

16. The method of claim 1, wherein the polymer flow has a first pigment mixed therein.

17. The method of claim 1, wherein injecting the first additive into the polymer flow of the main polymer transfer line comprises changing the flow rate of the first additive at least three times within fifteen minutes to provide at least a fourth flow rate that is different from each of the first flow rate, second flow rate, and third flow rate.

18. The method of claim 1, wherein forming, by the at least one spinneret, at least one fiber from the modified polymer flow comprises forming a yarn comprising a plurality of fibers.

19. The method of claim 1, changing the flow rate of the first additive at least twice within fifteen minutes comprises changing the let down rate of the first additive at least twice within fifteen minutes to provide at least a first let down rate, a second let down rate that occurs after the first let down rate, and a third let down rate that occurs after the second let down rate, wherein the second let down rate is greater than each of the first let down rate and the third let down rate, or wherein the second let down rate is lower than each of the first let down rate and the third let down rate.

20. The method of claim 1, wherein injecting the first additive into the polymer flow of the main polymer transfer line comprises changing the flow rate of the first additive at least four times within fifteen minutes.

* * * * *